(12) United States Patent
Liu

(10) Patent No.: US 8,040,990 B2
(45) Date of Patent: Oct. 18, 2011

(54) METHOD AND APPARATUS FOR ESTIMATING SAMPLING FREQUENCY OFFSET, AND SAMPLING TIMING RECOVERY LOOP INCLUDING THE APPARATUS

(75) Inventor: Guanghui Liu, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 630 days.

(21) Appl. No.: 12/173,078

(22) Filed: Jul. 15, 2008

(65) Prior Publication Data

US 2009/0022236 A1    Jan. 22, 2009

(30) Foreign Application Priority Data

Jul. 16, 2007  (KR) .................. 10-2007-0071279

(51) Int. Cl.
*H04L 7/00*  (2006.01)

(52) U.S. Cl. .................. 375/355; 375/260; 375/329

(58) Field of Classification Search .................. 375/355, 375/329
See application file for complete search history.

(56) References Cited

U.S. PATENT DOCUMENTS

| | | | |
|---|---|---|---|
| 6,839,380 B1 * | 1/2005 | Ding et al. | ..... 375/149 |
| 2001/0017902 A1 * | 8/2001 | Yamagata et al. | ..... 375/329 |
| 2005/0084046 A1 | 4/2005 | Seo | |
| 2006/0039507 A1 | 2/2006 | Lee | |
| 2007/0009074 A1 | 1/2007 | Ma | |
| 2008/0025424 A1 * | 1/2008 | Yang et al. | ..... 375/260 |

* cited by examiner

*Primary Examiner* — Dac Ha
*Assistant Examiner* — Tanmay Shah
(74) *Attorney, Agent, or Firm* — Volentine & Whitt, PLLC

(57) ABSTRACT

An apparatus for estimating a sampling frequency offset includes a waveform characteristic extraction unit, a variation quantity calculation unit, and a SFO (sampling frequency offset) estimator. The waveform characteristic extraction unit extracts a waveform characteristic of a training sequence period in one frame period of a sample data signal and outputs a waveform characteristic value corresponding to the waveform characteristic of the training sequence period. The variation quantity calculation unit calculates a waveform characteristic variation quantity representing a variation quantity in waveform characteristic between an m-th frame and an (m−k)-th frame based on a waveform characteristic value in the m-th frame and a waveform characteristic value in the (m−k)-th frame, where m and k are independently integers of 1 or more. The SFO estimator estimates an SFO of the sample data signal based on the waveform characteristic variation quantity.

20 Claims, 5 Drawing Sheets

METHOD AND APPARATUS FOR ESTIMATING SAMPLING FREQUENCY OFFSET, AND SAMPLING TIMING RECOVERY LOOP INCLUDING THE APPARATUS

PRIORITY CLAIM

A claim of priority is made to Korean Patent Application No. 10-2007-0071279, filed Jul. 16, 2007, in the Korean Intellectual Property Office, the disclosure of which is incorporated herein in its entirety by reference.

SUMMARY

The present invention generally relates to a method and apparatus for estimating a sampling frequency offset and a sampling timing recovery loop having the same, and more particularly, to a technique for estimating a sampling frequency offset based on a waveform characteristic variation quantity among frames.

A sampling operation is necessary to convert an analog data signal into a digital data signal. For example, in the receiver of a broadcasting and communication system, a digital data signal is obtained by sampling an analog data signal received through a wired and/or wireless channel. The timing at which the analog data signal is sampled (i.e., the sampling timing) has a significant influence on the accuracy of the digital data signal.

FIG. 1 illustrates a procedure which may be utilized to obtain a digital data signal by sampling an analog data signal.

A received analog data signal S_in is input to a sampler 120 via an analog processor 110. The sampler 120 converts the analog data signal into a discrete data signal based on a sampling clock CK that is input from an oscillator 130. A digital processor 140 outputs digital data signal D_out by processing the discrete data signal from the sampler 120.

The oscillator 130 is designed to generate a sampling clock CK having a fixed frequency. However, the frequency of the sampling clock CK may vary slightly due to characteristics of the oscillator 130 or influences from a surrounding environment. A frequency difference between the actual sampling clock CK and designed sampling clock CK is referred to as a sampling frequency offset, which can be the source of sampling timing error. The sampling timing error refers to a difference between a correct sampling timing (i.e., a sampling timing which produces accurate results) and an actual sampling timing.

Also, even when the sampling frequency offset is zero, a situation can develop in which actual sampling timings are entirely shifted in phase forward or backward, resulting in sampling timing error. The degree of shift between the actual sampling timings and the correct sampling timings is referred to as a sampling phase offset. The sampling phase offset may be at least partially corrected by a channel equalizer included in the receiver of a broadcasting communication system.

If a sampling result is output during a sampling timing error, accuracy of a digital data signal D_in can deteriorate considerably.

According to an aspect of the present invention, an apparatus is provided for estimating a sampling frequency offset. The apparatus includes a waveform characteristic extraction unit, a variation quantity calculation unit, and a SFO (sampling frequency offset) estimator. The waveform characteristic extraction unit extracts a waveform characteristic of a training sequence period in one frame period of a sample data signal and outputs a waveform characteristic value corresponding to the waveform characteristic of the training sequence period. The variation quantity calculation unit calculates a waveform characteristic variation quantity representing a variation quantity in waveform characteristic between an m-th frame and an (m−k)-th frame based on a waveform characteristic value in the m-th frame and a waveform characteristic value in the (m−k)-th frame, where m and k are independently integers of 1 or more. The SFO estimator estimates an SFO of the sample data signal based on the waveform characteristic variation quantity.

According to another aspect of the present invention, a sampling timing recovery loop is provided which includes an interpolator, a waveform characteristic extraction unit, a variation quantity calculation unit, a SFO (sampling frequency offset) estimator, a loop filter, and a controller. The interpolator interpolates a discrete data signal and outputs a sample data signal. The waveform characteristic extraction unit outputs a waveform characteristic value corresponding to a waveform characteristic of a training sequence period in one frame period of the sample data signal. The variation quantity calculation unit calculates a waveform characteristic variation quantity based on a waveform characteristic value in an m-th frame and a waveform characteristic value in an (m−k)-th frame, where m and k are independently integers of 1 or more. The SFO estimator which estimates an SFO of the sample data signal based on the waveform characteristic variation quantity. The loop filter filters the sampling frequency offset output from the SFO estimator and outputs an offset information signal. The controller which outputs an offset control signal corresponding to the offset information signal to the interpolator so as to correct a sampling timing error of the sample data signal.

According to still another aspect of the present invention, a method of estimating a sampling frequency offset is provided. The method includes detecting a peak in a waveform of a training sequence period in one frame period of a sample data signal, extracting a waveform characteristic value corresponding to a waveform characteristic of the detected peak, delaying a waveform characteristic value in an (m−k)-th frame by k frames and outputting the delayed waveform characteristic value, calculating a waveform characteristic variation quantity based on a waveform characteristic value in an m-th frame and the waveform characteristic value in the (m−k)-the frame, and estimating a sampling frequency offset of the sample data signal based on the waveform characteristic variation quantity. The method may further include amplifying the peak in the waveform of the training sequence period by correlating a PN (pseudo-noise) sequence included in the training sequence with a generated local PN sequence.

BRIEF DESCRIPTION OF THE DRAWINGS

The above and other aspects and features of the present invention will become readily apparent from the detailed description that follows, with reference to the accompanying drawings, in which.

DETAILED DESCRIPTION EMBODIMENTS

Exemplary and non-limiting embodiments of the invention will be described below. First, however, a sampling timing recovery operation will be schematically described with reference to the sampling timing recovery loop illustrated in FIG. 2.

Figure 1:
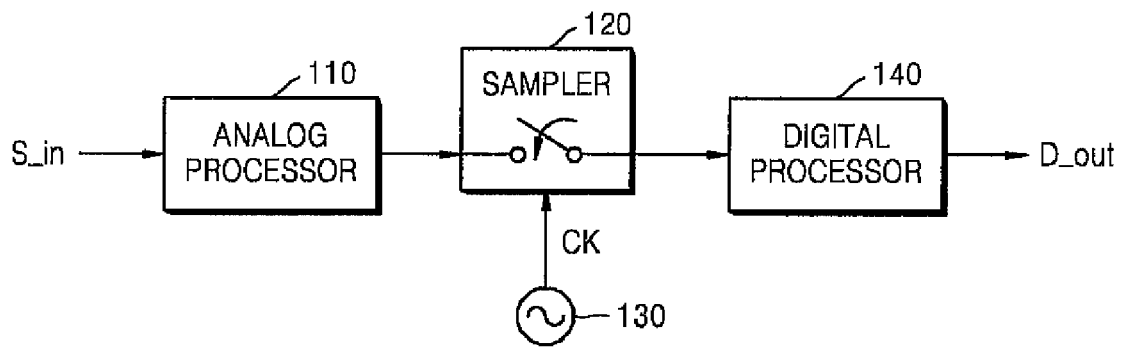
FIG. 1 is a block diagram illustrating a procedure used to obtain a digital data signal by sampling an analog data signal.
Figure 2:
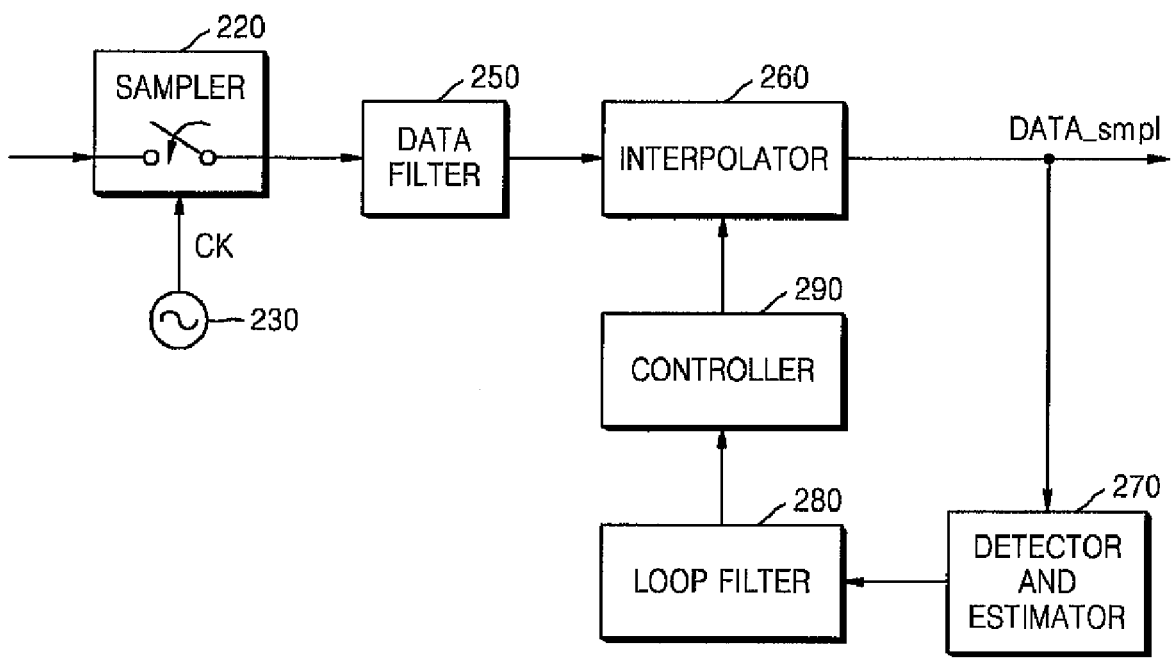
FIG. 2 illustrates a sampling timing recovery loop.

The sampling timing recovery loop of FIG. 2 includes a sampler 220, an oscillator 230, a data filter 250, an interpolator 260, a detector and an estimator 270, a loop filter 280, and a controller 290. More precisely, in FIG. 2, the interpolator 260, the detector and estimator 270, the loop filter 280, and the controller constitute the sampling timing recovery loop.

The sampler 220 converts an analog data signal into a discrete data signal based on a sampling clock CK that is input from the oscillator 230. The discrete data signal that is output from the sampler 220 is input to the interpolator 260 via the data filter 250. The interpolator 260 interpolates the discrete data signal to output a sample data signal DATA_smpl. The sample data signal DATA_smpl passes through the next procedure of data processing, and finally a resultant digital data signal is obtained.

The sampling timing recovery loop serves to correct the sample data signal DATA_smpl when a sampling timing error occurs. That is, the detector and estimator 270 detects a sampling timing error from the sample data signal DATA_smpl and estimates a sampling frequency offset from the detected sampling timing error. When the estimation result is fed back to the interpolator 260 via the loop filter 280 and the controller 290, the interpolator 260 corrects the sampling data signal DATA_smpl by adjusting parameters of the interpolator 260.

For various reasons, the estimation range of sampling frequency offset of the detector and estimator 270 is limited. If an actual sampling frequency offset exceeds the possible estimation range of the detector and estimator 270, since it is difficult to accurately estimate the sampling frequency offset, it is difficult to expect a reliable sampling timing recovery. Accordingly, an apparatus for estimating a sampling frequency offset with a wider estimation range is required.

Hereinafter, exemplary embodiments of the present invention will now be described in detail with reference to the attached drawings. As is customary in the field of the present invention, the embodiment(s) are illustrated in the form of functional block diagrams. As will be readily understood, the functional blocks may be physically implemented in the form nonprogrammable and/or programmable electronic circuits. Also, two or more functional blocks may be physically combined into more complex electronic circuitry.

Figure 3:
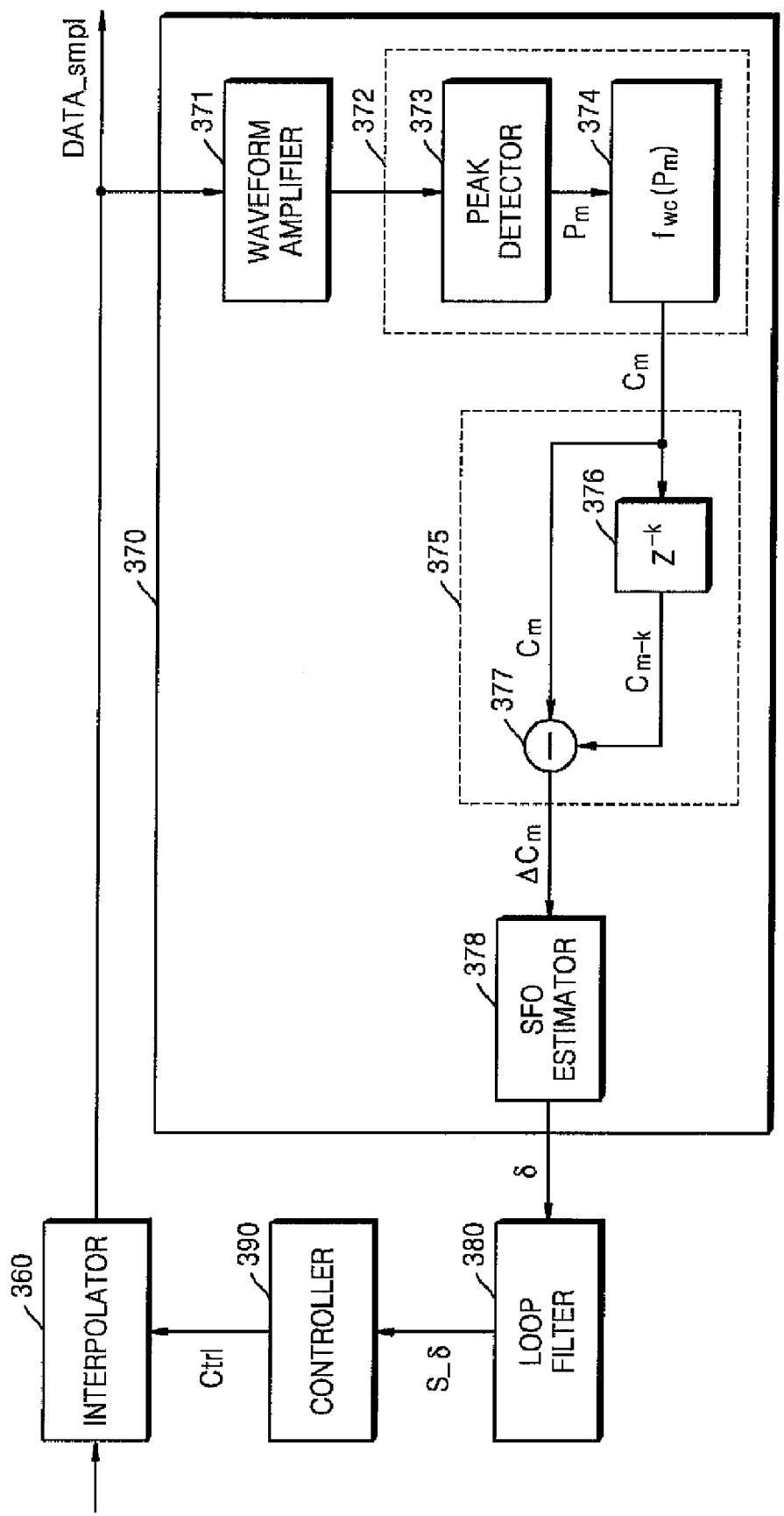
FIG. 3 illustrates a sampling timing recovery loop according to an exemplary embodiment of the present invention.

FIG. 3 illustrates a sampling timing recovery loop according to an exemplary embodiment of the present invention.

The sampling timing recovery loop shown in FIG. 3 includes an interpolator 360, an apparatus 370 for estimating a sampling frequency offset, a loop filter 380, and a controller 390.

The apparatus 370 for estimating the sampling frequency offset includes a waveform characteristic extraction unit 372, a variation quantity calculation unit 375, and a sampling frequency offset (SFO) estimator 378. Also, as shown in FIG. 3, the apparatus 370 for estimating the sampling frequency offset may further include a waveform amplifier 371.

The interpolator 360 interpolates a discrete data signal to output a sample data signal DATA_smpl. The discrete data signal is obtained by sampling an analog data signal based on a sampling clock (see, for example, FIG. 2). When a sampling timing error is caused by a sampling frequency offset during a sampling operation, correction of the sample data signal DATA_smpl is required.

The waveform amplifier 371 receives the sample data signal DATA_smpl that is output from the interpolator 360. The waveform amplifier 371 amplifies a waveform of a training sequence period included in one frame period of the sample data signal DATA_smpl, and outputs the amplified waveform to the waveform characteristic extraction unit 372. The waveform of the training sequence period will be described with reference to FIG. 4.

Figure 4:
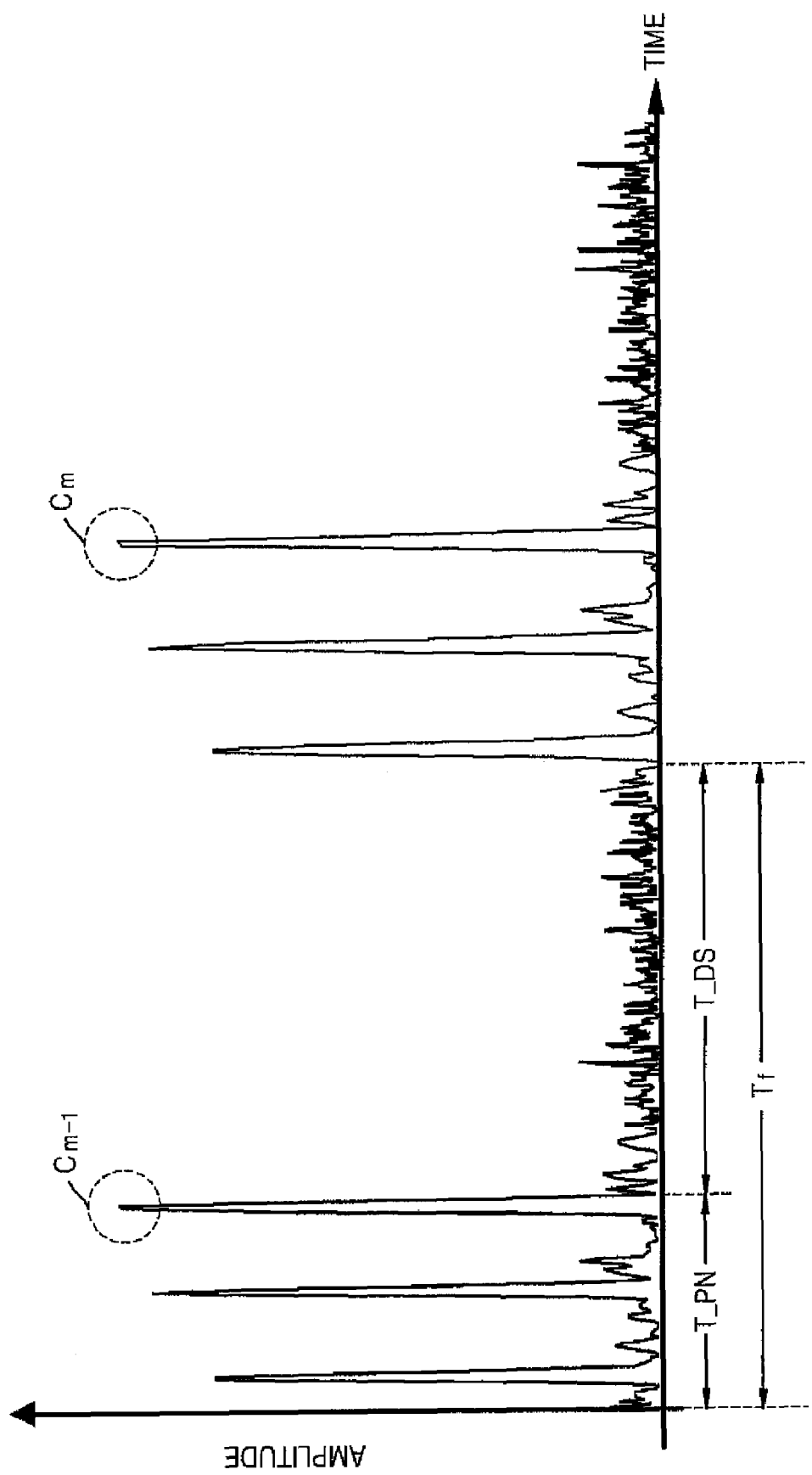
FIG. 4 illustrates an example of a waveform of a signal that is output from a waveform amplifier of FIG. 3.

FIG. 4 illustrates an example of a waveform of a signal that is output from the waveform amplifier 371 of FIG. 3.

As shown in FIG. 4, one frame period Tf of the sample data signal DATA_smpl includes a training sequence period T_PN and a data symbol period T_DS. In an orthogonal frequency division multiplexing (OFDM) system such as a time domain synchronous-orthogonal frequency division multiplexing (TDS-OFDM) system, a training sequence is inserted between neighboring data symbols so as to prevent inter-symbol interference (ISI). The training sequence includes a pseudo-noise (PN) sequence. The receiver in the OFDM system is equipped to execute a synchronization process based on the PN sequence.

The waveform amplifier 371 of FIG. 3 amplifies peaks (hereinafter, referred to as "PN peaks") in a waveform of the training sequence period T_PN and outputs the amplified peaks. FIG. 4 illustrates an example of a case where there are three PN peaks in a waveform of the training sequence period T_PN. In the present embodiment, the sampling frequency offset is estimated based on a variation quantity in waveform characteristic of the PN peaks among frames, thus making it possible to improve the accuracy of estimating a sampling frequency offset by increasing a signal-to-noise ratio (SNR) of the PN peaks by amplifying the PN peaks.

Specifically, the waveform amplifier 371 amplifies a PN peak and outputs the amplified PN peak to the waveform characteristic extraction unit 372, when the SNR of the PN peak is less than a predetermined reference value. On the other hand, it is not necessary to amplify the PN peak when the SNR of the PN peak is greater than the predetermined reference value. Accordingly, in the present embodiment, the waveform amplifier 371 outputs the non-amplified PN peak to the waveform characteristic extraction unit 372 when the SNR of the PN peak is greater than the predetermined reference value. In order to amplify the PN peak, the waveform amplifier 371 may include a PN correlator. The PN correlator correlates a pseudo-noise (PN) sequence included in the received training sequence with a local PN sequence generated by the PN correlator, and outputs the correlated PN sequence so as to amplify the PN peak.

The waveform characteristic extraction unit 372 of FIG. 3 outputs a waveform characteristic value Cm corresponding to a waveform characteristic (for example, a waveform characteristic of the PN peak) of the training sequence period T_PN. The waveform characteristic extraction unit 372 shown in FIG. 3 includes a peak detector 373 and a characteristic value extractor 374.

The peak detector 373 detects PN peaks in a waveform of the training sequence period T_PN, and outputs a waveform characteristic vector Pm for representing a waveform characteristic of the detected PN peaks. As shown in FIG. 4, when there are two or more PN peaks in a waveform of the training sequence period T_PN, the peak detector 373 can output the waveform characteristic vector Pm for representing a waveform characteristic of a PN peak of which amplitude is highest among the two or more PN peaks,. As the amplitude of the PN peak increases, the SNR of the PN peak increases. Accordingly, a waveform characteristic vector Pm is extracted from a PN peak of which the SNR is high so as to accurately estimate the sampling frequency offset. It will be understood by those skilled in the art that a third PN peak is taken in a waveform of a training sequence period T_PN in a second frame regardless of the amplitudes of the PN peaks, when a third PN peak is taken in a waveform of a training sequence period T_PN in a first frame.

The characteristic value extractor 374 extracts a waveform characteristic value Cm from the waveform characteristic vector Pm that is input from the peak detector 373. The waveform characteristic value Cm represents a waveform characteristic of the PN peaks in the waveform of the training sequence period T_PN. That is, the waveform characteristic value Cm includes information denoting amplitudes of the PN peaks, positions of the PN peaks, and/or distortion degrees of the PN peaks. As shown in FIG. 3, a function which may be performed by the characteristic value extractor 374 is represented by Equation 1.

$$Cm = f_{wc}(Pm) \qquad \text{Equation 1}$$

In Equation 1, a function $f_{wc}$ generally denotes any of various functions for representing a mathematical relation between the waveform characteristic vector Pm and the waveform characteristic value Cm. The embodiment is not limited to any particular function $f_{wc}$.

The variation quantity calculation unit 375 of FIG. 3 calculates a waveform characteristic variation quantity ΔCm for representing a variation quantity in waveform characteristic between an m-th frame and an (m−k)-th frame, based on the waveform characteristic value Cm in the m-th frame and a waveform characteristic value Cm−k in the (m−k)-th frame. The variation quantity calculation unit 375 shown in the example of FIG. 3 includes a delayer 376 and a subtracter 377.

The delayer 376 delays the waveform characteristic value Cm−k in the (m−k)-th frame that is output from the waveform characteristic extraction unit 372 by k number of frames, and outputs the delayed value to the subtracter 377. The subtracter 377 calculates a difference between the waveform characteristic value Cm in the m-th frame that is output from the waveform characteristic extraction unit 372 and the waveform characteristic value Cm−k in the (m−k)-th frame that is output from the delayer 376, and outputs the waveform characteristic variation quantity ΔCm. The waveform characteristic variation quantity ΔCm may be represented by Equation 2.

$$\Delta Cm = Cm - Cm-k \qquad \text{Equation 2}$$

The number of frames by which the waveform characteristic value input into the delayer 376 is delayed is determined in consideration of accuracy and complexity (for example, complexity of calculation and complexity of embodying hardware) of estimating the sampling frequency offset. As the number k of the delayed frames increases, the accuracy of estimating the sampling frequency offset increases. However, the complexity of estimating the sampling frequency offset also increases. As non-limiting examples, the number k of the delayed frames may be set to 1 or 2. In a case where the number k of the delayed frames is set to 1, as shown in FIG. 4, the waveform characteristic variation quantity ΔCm is calculated from a difference between a waveform characteristic value Cm−1 in an (m−1)-th frame and the waveform characteristic value Cm in the m-th frame.

The SFO estimator 378 of FIG. 3 estimates a sampling frequency offset (SFO) of sample data signal DATA_smpl based on the waveform characteristic variation quantity ΔCm. For example, the SFO estimator 378 may first calculate a variation quantity Δε of a sampling timing error from the waveform characteristic variation quantity ΔCm. The variation quantity Δε of the sampling timing error represents a difference in sampling timing error between the (m−k)-th frame and the m-th frame. The variation quantity Δε of the sampling timing error may be calculated in accordance with Equation 3 below. In Equation 3, Kd denotes a loop gain of a sampling timing recovery loop, which will be discussed later with reference to FIG. 5.

$$\Delta \varepsilon = \frac{\Delta Cm}{Kd} \qquad \text{Equation 3}$$

Next, in this example, the SFO estimator estimates a sampling frequency offset δ from the variation quantity Δε of the sampling timing error. As shown in Equation 4 below, the SFO estimator 378 calculates a sampling frequency offset δ by averaging the variation quantity Δε of the sampling timing error with the number k of the delayed frames or by averaging the waveform characteristic variation quantity ΔCm with the number k of the delayed frames. As an interval between the (m−k)-th frame and the m-th frame increases (that is, as the number k of the delayed frames increases), the variation quantity Δε of the sampling timing error increases. Accordingly, the sampling frequency offset δ is calculated by averaging the variation quantity Δε of the sampling timing error or the waveform characteristic variation quantity ΔCm with the number k of the delayed frames.

$$\delta = \frac{\Delta \varepsilon}{k \times Nf} = \frac{\Delta Cm}{k \times Nf \times Kd} \qquad \text{Equation 4}$$

Here, Nf denotes the number of samples included in one frame period. The number Nf of the samples is calculated in accordance with Equation 5 as follows:

$$Nf = \frac{Tf}{Ts}, \qquad \text{Equation 5}$$

In Equation 5, Tf denotes a length of one frame period (that is, a frame period) and Ts indicates a sampling period. In the case of a four fold-up sampling process, Nf is increased four times.

Figure 5:
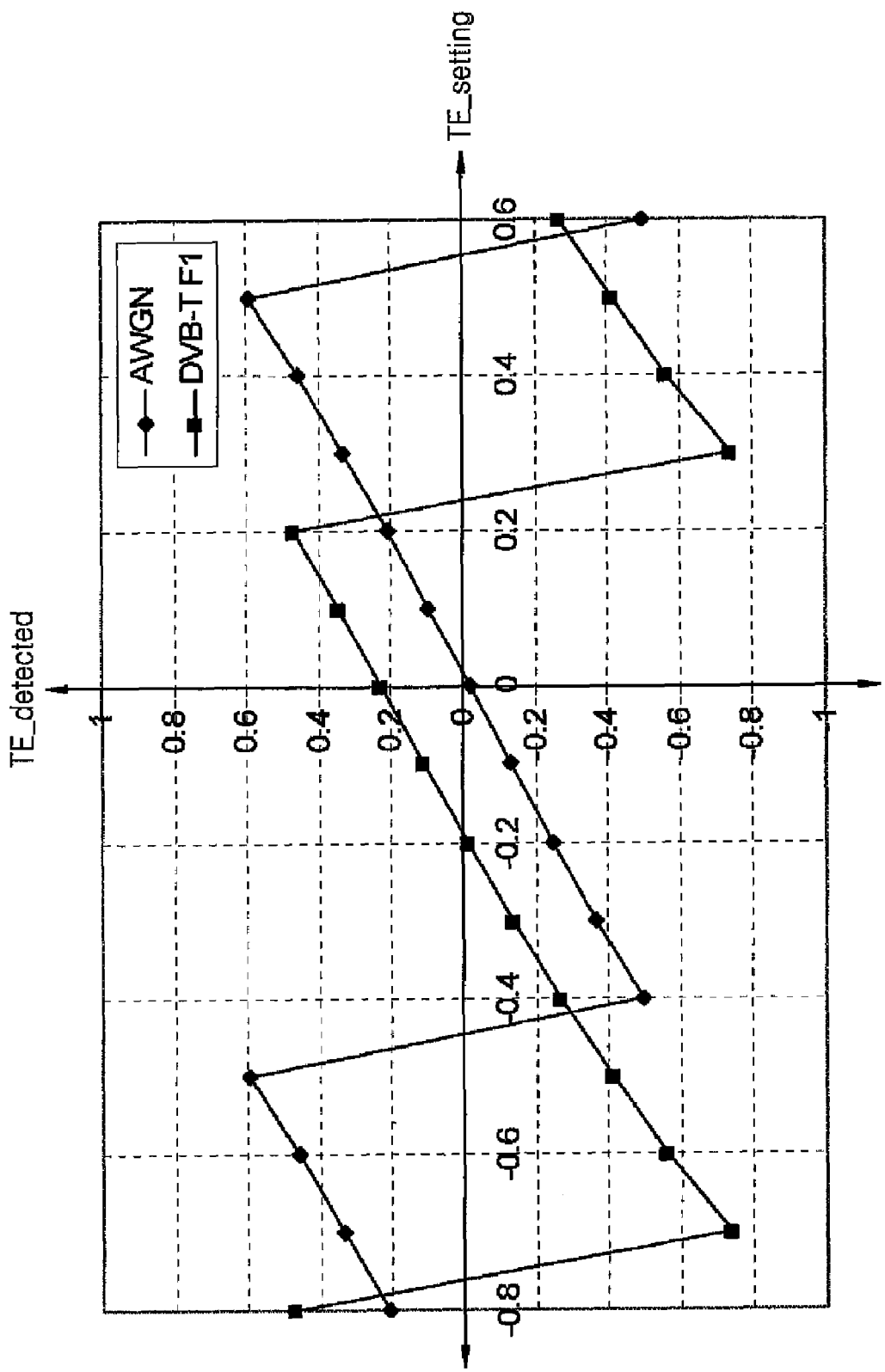
FIG. 5 illustrates a relation between a setting value of a sampling timing error and a detected value of a sampling timing error.

FIG. 5 illustrates a relation between a setting value of a sampling timing error and a detected value of a sampling timing error.

In FIG. 5, a simulation result of a digital terrestrial television broadcasting (DTTB) system that operates in a multi-carrier mode is shown. Specific simulation conditions are disclosed in Table 1.

TABLE 1

| System platform | Chinese standard of DTTB |
| --- | --- |
| Operation mode | Multi-carrier mode |
| Frame structure | frame head: 420 |
| | frame body: 3780 |
| Sampling | 4 fold-up sampling |
| Nf | 16800 = 4 * (420 + 3780) |
| number of frame delay | k = 1 |

The simulation result shown in FIG. 5 relates to the detection of a sampling timing error. That is, when the sampling timing error that occurs during a sampling operation of a sampler is intentionally set to TE_setting, TE_detected indicates a sampling timing error detected by the apparatus 370 for estimating the sampling frequency offset which operates under an open loop condition. Here, the open loop condition is a condition in which the loop filter 380 and the controller 390 do not operate in the sampling timing recovery loop. In other words, the open loop condition is a condition in which the sampling frequency offset δ estimated by the apparatus 370 for estimating the sampling frequency offset is not fed back to the interpolator 360.

As shown in FIG. 5, a simulation graph with respect to an additive white Gaussian noise (AWGN) channel is substantially symmetrical to the origin. When the simulation graph is symmetrical to the origin, the origin is a zero-crossing point. However, a simulation graph for a digital video broadcasting-terrestrial (DVB-T) F1 channel is asymmetrical to the origin. When the simulation graph is asymmetrical to the origin, the origin is not a zero-crossing point.

On the other hand, a slope of the simulation graph at a point of TE_setting=0 indicates the loop gain Kd in Equation 3. In FIG. 5, in the case of the AWGN channel, the slope of the simulation graph at a point of TE_setting=0 is about 1.2. In case of the DVB-T F1 channel, the slope of the simulation graph at a point of TE_setting=0 is also about 1.2. Accordingly, it is possible to experimentally obtain the loop gain Kd in Equation 3.

The loop filter 380 in FIG. 3 outputs an offset information signal S_δ by loop-filtering the sampling frequency offset δ that is output from the SFO estimator 378. In order to correct the sampling timing error of the sample data signal DATA_smpl, the controller outputs an offset control signal Ctrl corresponding to the offset information signal S_δ to the interpolator 360. The interpolator 360 outputs the sample data signal DATA_smpl of which the sampling timing error is corrected by adjusting parameters of the interpolator 360 in response to the offset control signal Ctrl.

When the sampling timing recovery operation is performed by the apparatus 370 for estimating the sampling frequency offset, the loop filter 380, the controller 390, and the interpolator 360, it is possible to output the sample data signal DATA_smpl of which the sampling timing error is corrected.

Figure 6:
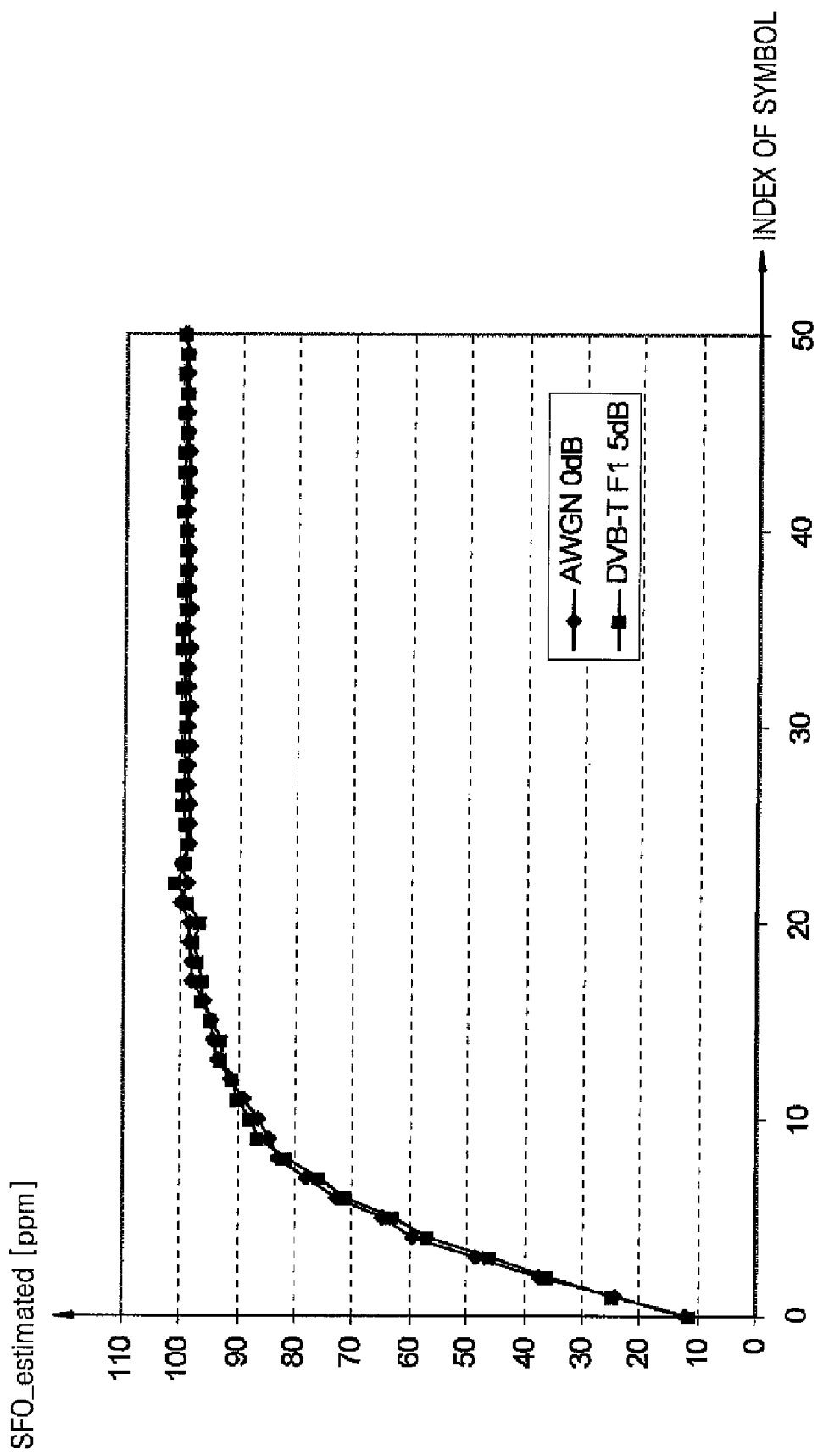
FIG. 6 illustrates a simulation result obtained by applying an apparatus for estimating a sampling frequency offset according to an exemplary embodiment of the present invention.

FIG. 6 illustrates a simulation result obtained by applying an apparatus for estimating a sampling frequency offset according to an exemplary embodiment of the present invention.

A simulation result for estimating the sampling frequency offset shown in FIG. 6 relates to a case where the sampling frequency offset that occurs during a sampling operation of a sampler is intentionally set to 100 parts per million (ppm). In FIG. 6, the transverse axis indicates an index of a symbol, the longitudinal axis indicates an estimated value SFO_estimated of the sampling frequency offset which is output from the apparatus (for example, 370 of FIG. 3) for estimating the sampling frequency offset. The estimated value SFO_estimated of the sampling frequency offset shown in FIG. 6 is output by the apparatus 370 for estimating the sampling frequency offset which operates under a closed loop condition. Under the closed loop condition, since the sampling timing recovery loop is fully operational, the sampling frequency offset δ estimated by the apparatus 370 for estimating the sampling frequency offset is fed back to the interpolator 360 via the loop filter 380 and the controller 390. In FIG. 6, a simulation result for the AWGN channel of which the SNR is 0 dB and a simulation result for the DVB-T F1 channel of which the SNR is 5 dB are shown.

As shown in FIG. 6, the simulation result for the AWGN channel is substantially matched with the simulation result for the DVB-T F1 channel. In the simulation results shown in FIG. 6, the estimated value SFO_estimated of the sampling frequency offset reaches 100 ppm after about 20 symbols. If a period from a zeroth symbol to twentieth symbol is a tracking period, a period after the twentieth symbol is a lock-state period. In the tracking period, an error of estimating the sampling frequency offset is reduced by repeating the feedback loop. In the lock-state period, the estimated value SFO_estimated of the sampling frequency offset is substantially fixed.

While the range of the sampling frequency offset that can be estimated by an apparatus for estimating a sampling frequency offset according a conventional technique ranges to about 30 ppm, the apparatus for estimating a sampling frequency offset according to an embodiment of the present invention can estimate a sampling frequency offset equal to or greater than 100 ppm.

As described above, the apparatus for estimating a sampling frequency offset according to an exemplary embodiment of the present invention estimates the sampling frequency offset based on a variation quantity of a waveform characteristic of PN peaks among frames. Since the estimation range of the sampling frequency offset is relatively wide, the performance of the apparatus for estimating the sampling frequency offset is improved.

The apparatus for estimating the sampling frequency offset according to the exemplary embodiment can be applied to a variety of different systems, including TDS-OFDM systems and various broadcasting and communication systems.

In a method of estimating the sampling frequency offset according to an exemplary embodiment of the present invention, peaks in a waveform of a training sequence period T_PN in one frame period of sample data signal DATA_smpl are detected. Before detecting the peaks, the peaks in the waveform of the training sequence period T_PN may be amplified by correlating a PN sequence included in the training sequence with a local PN sequence generated by the PN correlator. Next, a waveform characteristic value Cm corresponding to a waveform characteristic of the detected peak is extracted.

A waveform characteristic value Cm−k in an (m−k)-th frame is delayed by k numbers of frames and output. A waveform characteristic variation quantity ΔCm is calculated based on the waveform characteristic value Cm in an m-th frame and the waveform characteristic value Cm−k in the (m−k)-th frame. The sampling frequency offset of the sample data signal DATA_smpl is estimated based on the calculated waveform characteristic variation quantity ΔCm.

In the method and apparatus for estimating the sampling frequency offset, it is possible to accurately estimate a sampling frequency offset with a wider estimation range. In addition, in the sampling timing recovery loop, it is possible to stably perform a sampling timing recovery operation, even when a sampling frequency offset with a wide range occurs.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for estimating a sampling frequency offset, the apparatus comprising:
   a waveform characteristic extraction unit which extracts a waveform characteristic of a training sequence period in one frame period of a sample data signal and outputs a waveform characteristic value corresponding to the waveform characteristic of the training sequence period;
   a variation quantity calculation unit which calculates a waveform characteristic variation quantity representing a variation quantity in waveform characteristic between an m-th frame and an (m−k)-th frame based on a waveform characteristic value in the m-th frame and a waveform characteristic value in the (m−k)-th frame, where m and k are independently integers of 1 or more;
   a SFO (sampling frequency offset) estimator which estimates an SFO of the sample data signal based on the waveform characteristic variation quantity,
   wherein the variation quantity calculation unit includes:
   a delayer which delays the waveform characteristic value in the (m−k)-th frame by k frames and outputs the delayed waveform characteristic value; and
   a subtracter which calculates a difference between the waveform characteristic value in the m-th frame output from the waveform characteristic extraction unit and the waveform characteristic value in the (m−k)-th frame output from the delayer and outputs the waveform characteristic variation quantity.

2. The apparatus of claim 1, wherein the training sequence includes a PN (pseudo-noise) sequence.

3. The apparatus of claim 2, wherein one frame period of the sample data signal includes the training sequence period and a data symbol period, and
   wherein the PN sequence is inserted between neighboring data symbols to prevent ISI (inter-symbol interference).

4. The apparatus of claim 1, wherein the waveform characteristic value represents a waveform characteristic of a peak in a waveform of the training sequence period.

5. The apparatus of claim 4, wherein the waveform characteristic of the peak includes information denoting at least one of an amplitude of the peak, a position of the peak, and a distortion degree of the peak.

6. The apparatus of claim 1, further comprising a waveform amplifier which amplifies a waveform of the training sequence period and outputs the amplified waveform to the waveform characteristic extraction unit.

7. The apparatus of claim 6, wherein when an SNR (signal-to-noise ratio) of a peak in the waveform of the training sequence period is greater than a reference value, the waveform amplifier outputs the waveform of the training sequence period without amplification, and
   wherein when the SNR of the peak in the waveform of the training sequence period is less than the reference value, the waveform amplifier amplifies the waveform of the training sequence period and outputs the amplified waveform.

8. The apparatus of claim 6, wherein the waveform amplifier comprises a PN correlator which correlates a PN (pseudo-noise) sequence included in the training sequence with a local PN sequence generated by the PN correlator and outputs the correlation result.

9. The apparatus of claim 1, wherein the waveform characteristic extraction unit includes:
   a peak detector which detects a peak in a waveform of the training sequence period and outputs a waveform characteristic vector for representing a waveform characteristic of the detected peak; and
   a characteristic value extractor which extracts the waveform characteristic value from the waveform characteristic vector.

10. The apparatus of claim 9, wherein when there are two or more peaks in the waveform of the training sequence period, the peak detector outputs the waveform characteristic vector representing a waveform characteristic of a peak having a highest amplitude among the two or more peaks.

11. The apparatus of claim 1, wherein k is 1 or 2.

12. The apparatus of claim 1, wherein the SFO estimator calculates the sampling frequency offset by averaging the waveform characteristic variation quantity with k.

13. A sampling timing recovery loop comprising:
    an interpolator which interpolates a discrete data signal and outputs a sample data signal;
    a waveform characteristic extraction unit which outputs a waveform characteristic value corresponding to a waveform characteristic of a training sequence period in one frame period of the sample data signal;
    a variation quantity calculation unit which calculates a waveform characteristic variation quantity based on a waveform characteristic value in an m-th frame and a waveform characteristic value in an (m−k)-th frame, where m and k are independently integers of 1 or more;
    an SFO (sampling frequency offset) estimator which estimates an SFO of the sample data signal based on the waveform characteristic variation quantity;
    a loop filter which filters the sampling frequency offset output from the SFO estimator and outputs an offset information signal; and
    a controller which outputs an offset control signal corresponding to the offset information signal to the interpolator so as to correct a sampling timing error of the sample data signal,
    wherein the variation quantity calculation unit includes:
    a delayer which delays the waveform characteristic value in the (m−k)-th frame by k frames and outputs the delayed waveform characteristic value; and
    a subtracter which calculates a difference between the waveform characteristic value in the m-th frame output from the waveform characteristic extraction unit and the waveform characteristic value in the (m−k)-th frame output from the delayer and outputs the waveform characteristic variation quantity.

14. The sampling timing recovery loop of claim 13, wherein the interpolator outputs the sample data signal of which the sampling timing error is corrected by adjusting parameters of the interpolator in response to the offset control signal.

15. The sampling timing recovery loop of claim 13, wherein the discrete data signal is obtained by sampling an analog data signal based a sampling clock.

16. The sampling timing recovery loop of claim 13, wherein the waveform characteristic value represents a waveform characteristic of a peak in a waveform of the training sequence period.

17. The sampling timing recovery loop of claim 13, further comprising a waveform amplifier which amplifies a peak in a waveform of the training sequence period and outputs the amplified waveform to the waveform characteristic extraction unit.

18. The sampling timing recovery loop of claim 17, wherein the waveform amplifier includes a PN correlator which correlates a PN (pseudo-noise) sequence included in the training sequence with a local PN sequence generated by the PN correlator and outputs the correlation result.

19. The sampling timing recovery loop of claim 13, wherein the waveform characteristic extraction unit includes:
a peak detector which detects a peak in a waveform of the training sequence period and outputs a waveform characteristic vector representing a waveform characteristic of the detected peak; and
a characteristic value extractor which extracts the waveform characteristic value from the waveform characteristic vector.

20. The sampling timing recovery loop of claim 13, wherein the sampling timing recovery loop is contained in a TDS-OFDM (time domain synchronous-orthogonal frequency division multiplexing) system.

* * * * *